United States Patent [19]

Kawaguchi et al.

[11] Patent Number: 5,213,754

[45] Date of Patent: May 25, 1993

[54] THERMOFORMING PROCESS FOR FORMING A SHEET OF POLYBUTYLENE TEREPHTHALATE INTO A TRANSPARENT CONTAINER

[75] Inventors: Kuniaki Kawaguchi; Toshio Nakane; Hiroaki Konuma; Yukihiko Kageyama; Kenji Hijikata, all of Shizuoka, Japan

[73] Assignee: Polyplastics Co., Ltd., Osaka, Japan

[21] Appl. No.: 675,266

[22] Filed: Mar. 26, 1991

[30] Foreign Application Priority Data

Mar. 27, 1990 [JP] Japan ............................ 2-77766

[51] Int. Cl.$^5$ .................. B29C 51/02; B29C 51/42
[52] U.S. Cl. .................. 264/544; 264/210.2; 264/235; 264/331.21; 264/346; 264/553
[58] Field of Search ............... 264/544, 522, 235, 346, 264/553, 331.21, 210.2, 280, 322

[56] References Cited

U.S. PATENT DOCUMENTS

| 4,110,395 | 8/1978 | Akutin et al. | 264/235 |
| 4,261,473 | 4/1981 | Yamada et al. | 264/532 |
| 4,380,526 | 4/1983 | Agrawal | 264/532 |
| 4,388,356 | 6/1983 | Hrivnak et al. | 264/547 |
| 4,469,270 | 9/1984 | Gartland | 264/544 |
| 4,725,664 | 2/1988 | Halmess et al. | 528/176 |
| 4,878,826 | 11/1989 | Wendt | 264/549 |

FOREIGN PATENT DOCUMENTS

| 2174131 | 10/1973 | France . |
| 53-99296 | 8/1978 | Japan . |
| 57-55922 | 4/1982 | Japan . |
| 60-52337 | 3/1985 | Japan . |

Primary Examiner—Jan H. Silbaugh
Assistant Examiner—Catherine Timm
Attorney, Agent, or Firm—Birch, Stewart, Kolasch & Birch

[57] ABSTRACT

A transparent polyester container is produced by melt-molding a copolyester resin containing 75 to 98 molar % of repeating units of an ester of terephthalic acid with 1,4-butanediol with the balance mainly containing repeating units of an ester of terephthalic acid with an alkylene oxide adduct of a bisphenol compound, rapidly cooling the molding to prepare a sheet having a low crystallinity, maturing the sheet at a temperature selected so as to meet a requirement represented by the following formula (1) to prepare a sheet satisfying a requirement represented by the following formula (2) and subjecting the sheet to thermoforming through the use of a cavity mold at a temperature falling within a range represented by the following formula (3):

| $Ta \leq Tcc$ | (°C.) | (1) |
|---|---|---|
| $(\Delta Hcc)_a \geq 5$ | (J/g) | (2) |
| $Tcc + 2 \leq Tb \leq Tm - 2$ | (°C.) | (3) | wherein $Ta$ is the maturing temperature (°C.),
$Tb$ is the cavity mold temperature (°C.),
$Tcc$ is the cold crystallization temperature (°C.),
$Tm$ is the melting point (°C.) of the resin, and
$(\Delta Hcc)_a$ is the quantity of heat (J/g) of cold crystallization of the sheet after maturing.

7 Claims, No Drawings

THERMOFORMING PROCESS FOR FORMING A SHEET OF POLYBUTYLENE TEREPHTHALATE INTO A TRANSPARENT CONTAINER

BACKGROUND OF THE INVENTION

1. Field of the Invention

The present invention relates to a polyester container and a process for producing the same. More particularly, the present invention relates to a polyester container having a high crystallinity and excellent transparency and thermal distortion resistance even in a heating atmosphere of a high temperature and to a process for producing the same.

2. Prior Art

In recent years, polybutylene terephthalate (PBT) has also been widely used in the field of packaging wherein the package comes into contact with chemicals and foods, because it is excellent in the mechanical properties and in the chemical resistance, resistance to permeation by gas and thermal resistance.

The PBT, however, brings about whitening upon being thermoformed due to its high crystallinity, so that a container having excellent transparency cannot be produced from the PBT.

It is possible to enhance the transparency and lower the crystallinity of the PBT through the introduction of other structural units in the polymer per se to prepare a copolymer. Containers produced by this technique, however, promote crystallization upon being heated and are likely to become opaque. Further, when the copolymer is amorphous as a whole, the properties inherent in the PBT are lost and in particular the strength and thermal resistance are remarkably deteriorated.

Thus it is very difficult for containers produced by the thermoforming of PBT or a copolymer of PBT to have excellent properties derived from the crystallinity, particularly both of thermal resistance and persistent transparency. Therefore, a container having both the above-described properties has earnestly been desired in the art.

SUMMARY OF THE INVENTION

The present inventors have made intensive studies with a view to solving the above-described problem and, as a result, have found that the use of a starting polymer comprising a polybutylene terephthalate copolymer having a given amount of particular comonomer units introduced thereinto and the treatment of a sheet prepared from this copolymer under a particular condition followed by molding makes it possible to provide a container having both transparency and high crystallinity and capable of maintaining the transparency and the thermal resistance in a heating atmosphere, which has led to the completion of the present invention.

Accordingly the present invention relates to a process for producing a transparent polyester container, characterized by melt-molding a copolyester resin comprising 75 to 98 molar % of repeating units of an ester of terephthalic acid with 1,4-butanediol with the balance mainly comprising repeating units of an ester of terephthalic acid with an alkylene oxide adduct of a bisphenol compound, rapidly cooling the molding to prepare a sheet having a low crystallinity, maturing the sheet at a temperature selected so as to meet a requirement represented by the following formula (1) to prepare a sheet satisfying a requirement represented by the following formula (2) and subjecting the sheet to thermoforming through the use of a cavity mold at a temperature falling within a range represented by the following formula (3); and a transparent polyester container produced by said process, which has a relative crystallinity of 50% or more and, in a heating atmosphere of 120° C., has a heat distortion resistance and maintains a haze value of 20% or less:

| | | |
|---|---|---|
| $T_a \leq T_{cc}$ | (°C.) | (1) |
| $(\Delta H_{cc})_a \geq 5$ | (J/g) | (2) |
| $T_{cc} + 2 \leq T_b \leq T_m - 2$ | (°C.) | (3) | wherein $T_a$ is the maturing temperature (°C.), $T_b$ is the cavity mold temperature (°C.), $T_{cc}$ is the cold crystallization temperature (°C.) of the resin as measured at a temperature rise rate of 10° C./min by differential thermal analysis according to JIS K7121, $T_m$ is the melting point (°C.) of the resin as measured at a temperature rise rate of 10° C./min by differential thermal analysis according to JIS K7121, and $(\Delta H_{cc})_a$ is the quantity of heat (J/g) of cold crystallization of the sheet after maturing as measured at a temperature rise rate of 10° C./min by differential thermal analysis according to JIS K7121.

The copolyester used in the present invention comprises 75 to 98 molar % of structural units represented by the following general formula (I) and composed of an ester unit of terephthalic acid with 1,4-butanediol with the balance mainly comprising repeating units of an ester of terephthalic acid with an alkylene oxide adduct of a bisphenol compound:

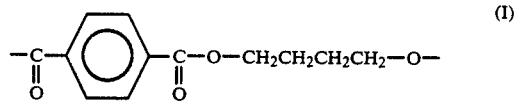

(I)

Starting compounds necessary for forming the copolyester used in the present invention will now be described in due order. At the outset, a starting compound necessary for forming a terephthaloyl group is terephthalic acid or its derivative, and examples of the derivative include dialkyl esters and diacyl derivatives. Among them, terephthalic acid and its dialkyl esters are preferred, and dimethyl terephthalate is particularly preferred.

A diol for forming a butylene terephthalate unit of the copolyester is introduced through the use of 1,4-butanediol as a monomer material.

In order to form the copolyester, it is necessary to use an alkylene oxide adduct of a bisphenol compound as a starting compound besides the above-described starting compounds.

Preferred examples of the alkylene oxide adduct of a bisphenol compound include those represented by the following general formulae (II) and (III):

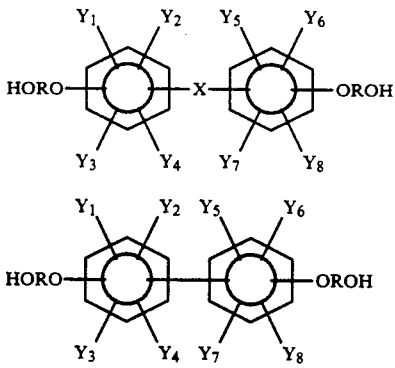

(II)

(III)

wherein R groups may be the same or different from each other and mainly comprises a group selected from among —CH$_2$CH$_2$—, —CH$_2$CH$_2$OCH$_2$CH$_2$—, —CH(CH$_3$)CH$_2$— and —CH$_2$CH(CH$_3$)—.

In the above-described formulae, X is mainly a group selected from among —O—, —S—, —SO$_2$—, —SO—,

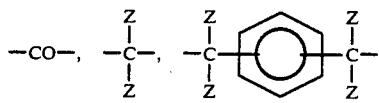

(wherein Z groups may be the same or different from each other and each a group selected from among hydrogen, an alkyl group, a cycloalkyl group, a halogenated alkyl group and a phenyl group),

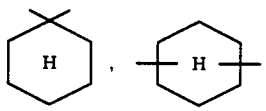

and an alkylene group.

In the above formulae, Y$_1$ to Y$_8$ may be the same or different from each other and each mainly a group selected from among hydrogen, an alkyl group, an alkoxy group, chlorine and bromine, and particularly preferably hydrogen.

Specific examples of the starting compound include alkylene oxide adducts of bisphenol compounds, such as bis(4-hydroxyphenyl) sulfone, 2,2-bis(4-hydroxyphenyl)propane, bis(4-hydroxyphenyl) ketone, bis(4-hydroxyphenyl) sulfide, bis(4-hydroxyphenyl) sulfoxide, bis(4-hydroxyphenyl) ether, bis(4-hydroxyphenyl)methane, bis(4-hydroxyphenyl)cyclohexane, bis(4-hydroxyphenyl)cycloalkane, bis(4-hydroxyphenyl)alkane, 2,2-bis-(3,4'-hydroxyphenyl)propane, 2,2-bis(4-hydroxyphenyl)hexafluoropropane, 4,4'-diphenol, 4,4'-[1,4-phenylenebis(1-methylethylidene)]bisphenol, 1,1-bis(4-hydroxyphenyl)-1-phenylethane, 2,2-bis(3,5-dimethyl-4-hydroxyphenyl)propane, 2,2-bis(3,5-dibromo-4-hydroxyphenyl)propane, bis(3,5-dimethyl-4-hydroxyphenyl) sulfone, and bis(3,5-dibromo-4-hydroxyphenyl) sulfone.

Among them, an ethylene oxide (2 mol) adduct of bis(4-hydroxyphenyl) sulfone, a propylene oxide (2 mol) adduct of bis(4-hydroxyphenyl) sulfone, an ethylene oxide (2 mol) adduct of 2,2-bis(4-hydroxyphenyl)propane, a propylene oxide (2 mol) adduct of 2,2-bis(4-hydroxyphenyl)propane, an ethylene oxide (2 mol) adduct of bis(4-hydroxyphenyl) sulfoxide, a propylene oxide (2 mol) adduct of bis(4-hydroxyphenyl) sulfoxide, an ethylene oxide (2 mol) adduct of bis(4-hydroxyphenyl) sulfide, a propylene oxide (2 mol) adduct of bis(4-hydroxyphenyl) sulfide, an ethylene oxide (2 mol) adduct of bis(4-hydroxyphenyl) ether, a propylene oxide (2 mol) adduct of bis(4-hydroxyphenyl) ether, an ethylene oxide (2 mol) adduct of bis(4-hydroxyphenyl)methane, a propylene oxide (2 mol) adduct of bis(4-hydroxyphenyl)methane, an ethylene oxide (2 mol) adduct of 4,4'-diphenol, a propylene oxide (2 mol) adduct of 4,4'-diphenol, an ethylene oxide (2 mol) adduct of bis(4-hydroxyphenyl)alkane, a propylene oxide (2 mol) adduct of bis(4-hydroxyphenyl)alkane, an ethylene oxide (2 mol) adduct of bis(4-hydroxyphenyl) ketone, a propylene oxide (2 mol) adduct of bis(4-hydroxyphenyl) ketone, etc., are particularly preferred from the viewpoint of the preparation of polymer.

In the copolyester constituting the present invention, it is necessary to use as a starting compound at least one comonomer selected from the above-described group, and the molar content of the comonomer based on the whole structural units should be 2 to 25 molar %, particularly preferably 5 to 20 molar %. When the molar content is less than 2 molar %, the crystallization rate of the copolyester is so high that it becomes difficult to prepare a sheet having a low crystallinity and, at the same time, the thermoformability is remarkably lowered due to a small difference between the glass transition temperature and the cold crystallization temperature. On the other hand, when the molar content is larger than 25 molar %, the relative crystallinity of the container produced by thermoforming is remarkably lowered, so that the lowering in the mechanical strengths and heat distortion properties becomes significant.

The above-described copolyesters can be prepared by interfacial polycondensation, melt polymerization, solution polymerization, etc., through the utilization of known condensation reaction and interesterification reaction. It is possible to prepare a product having a higher degree of polymerization by the solid-phase polymerization wherein the resultant resin is heat-treated under a reduced pressure or in the presence of an inert gas.

The intrinsic viscosity of the copolyester resin is preferably 0.7 or more from the viewpoint of the moldability. The intrinsic viscosity mentioned herein refers to one measured in o-chlorophenol at 25° C.

A sheet which is lowly crystalline, transparent and nonoriented can be prepared by drying the copolyester resin prepared by the above-described process at a temperature of preferably 90° to 150° C. for 3 hr or more, particularly preferably 5 hr or more, extruding the dried resin at an extruding temperature of 170° to 270° C. into a sheet by means of an extruder provided with a T-die and bringing the sheet into contact with a casting drum (chill roll) for rapid cooling. When the Tcc of the sheet is below 30° C., not only it becomes difficult to prepare a transparent sheet having a low crystallinity but also the thermoformability is remarkably spoiled because the crystallization of the sheet easily proceeds at room temperature. For this reason, the Tcc is preferably 30° C. or above from the practical viewpoint, particularly preferably 40° C. or above.

Some description will now be made on a preferred thickness of the sheet. When the thickness of the sheet is too large, only the surface becomes transparent when being cooled rapidly and the inside of the sheet is gradually cooled to bring about whitening. Further, when such a sheet is thermoformed, the thermoformability is remarkably spoiled due to poor shareability. When the thickness of the sheet is excessively small, the mechanical strengths of the sheet per se cannot be exhibited, so that the excellent practical effect is reduced. Therefore, the thickness of the sheet is preferably 0.05 to 2.00 mm, still preferably 0.10 to 1.00 mm. After the preparation of a sheet through rapid cooling, the sheet may be stretched monoaxially or biaxially at a low stretch ratio so as to have a predetermined thickness, but an unstretched sheet is preferred.

In the present invention, the sheet is matured after extrusion at a temperature selected so as to meet a requirement represented by the following formula (1). The maturing is conducted by a method wherein the sheet is immersed in a heating medium at a predetermined temperature, such as hot water, a method wherein the sheet is heated in a drier at a predetermined temperature, a method wherein hot air is blown against the sheet, and a method wherein use is made of radiant heat such as infrared radiation.

$$Ta \leq Tcc \quad (°C.) \tag{1}$$

wherein
   Ta is the maturing temperature (°C.), and
   Tcc is the cold crystallization temperature (°C.) of the resin as measured at a temperature rise rate of 10° C./min by differential thermal analysis according to JIS K7121.

When the maturing temperature is above Tcc(°C.), the sheet unfavorably becomes opaque due to rapid crystallization. The time necessary for maturing varies depending upon the kind of the alkylene oxide adduct of a bisphenol compound introduced into the copolyester resin, the content of the alkylene oxide adduct, the maturing temperature, and the thickness of the sheet. The higher the content of the comonomer introduced, the lower the maturing temperature or the larger the thickness of the sheet, the longer the necessary maturing time.

However, when the maturing time is too long, the crystallization of the sheet proceeds so remarkably that the sheet brings about a necking phenomenon or the like during thermoforming. This unfavorably leads to poor shapeability, variation of the thickness, etc. For this reason, the maturing should be conducted so that the sheet after the maturing satisfies a requirement represented by the following formula (2):

$$(\Delta Hcc)_a \geq 5 \quad (J/g) \tag{2}$$

wherein
   $(\Delta Hcc)_a$ is the quantity of heat (J/g) of cold crystallization of the sheet after maturing as measured at a temperature rise rate of 10° C./min by differential thermal analysis according to JIS K7121.
Preferably:

$$(\Delta Hcc)_a \leq 7 \ (J/g).$$

When the maturing temperature is low, the maturing should be conducted for a very long period of time, which is unfavorable from the viewpoint of productivity. The maturing temperature is preferably 30° C. or above.

The maturing time, for example, for a 0.3 mm-thick sheet prepared from a PBT copolyester containing as a comonomer 10 molar % of an ethylene oxide (2 mol) adduct of bis(4-hydroxyphenyl) sulfone is preferably about 2 min at 60° C., about 30 min at 50° C., about 8 hr at 40° C., about 120 hr at 35° C., and about 1500 hr at 30° C.

In the maturing treatment, the temperature may be kept constant, varied at two or more stages or continuously varied as far as the above-described requirements represented by the formulae (1) and (2) are satisfied.

Once the sheet is matured at a temperature selected so as to meet the requirement represented by the formula (1) for a period of time satisfying the requirement represented by the formula (2), it is subjected to the conventional thermoforming to form a container having a desired shape. The term "thermoforming" used in the present invention is a general term for the conventional forming methods such as vacuum forming and pressure forming. Examples of the forming machine used include a vacuum forming machine, a pressure forming machine and a universal forming machine wherein use is made of both of vacuum and pressure.

In the thermoforming, the sheet is preheated at a temperature above the glass transition point (Tg) for softening and then rapidly brought into close contact with a mold in a vacuum or under elevated pressure for shaping. When the preheating temperature for softening the sheet is above the cold crystallization temperature (Tcc), the crystallization of the, sheet proceeds so remarkably that the shapeability becomes poor and the thickness becomes variable. Therefore, the preheating temperature is preferably below Tcc.

The temperature of the mold during forming is represented by the following formula (3). The mold is a cavity mold brought into close contact with the sheet for shaping and crystallization of the sheet.

$$Tcc + 2 \leq Tb \leq Tm - 2 \quad (°C.) \tag{3}$$

wherein
   Tb is the cavity mold temperature (°C.),
   Tcc is the cold crystallization temperature (°C.) of the resin as measured at a temperature rise rate of 10° C./min by differential thermal analysis according to JIS K7121, and Tm is the melting point (°C.) of the resin as measured at a temperature rise rate of 10° C/min by differential thermal analysis according to JIS K7121.
The temperature is preferably:

$$(Tcc + 10 \leq Tb \leq Tm \leq 10 \ (°C.).$$

When the cavity mold temperature is below Tcc plus 2° C., unfavorably it becomes difficult to produce a container having a high crystallinity and the heating takes too long a time. On the other hand, when the temperature is raised, the treating time can be shortened. However, when the temperature is very close to the melting point, the shapeability remarkably lowers and the sheet partially melts due to heterogeneous heat treatment. For this reason, the temperature is preferably below Tm minus 2° C.

The forming under the above-described conditions enables crystallization to proceed while maintaining the transparency, so that the resultant container has a high crystallinity and can maintain the transparency even in a heating atmosphere of a high temperature.

The relative crystallinity (CR) of the transparent crystalline container after maturing is preferably 50% or more. The term "relative crystallinity" used herein is intended to mean a value determined by the DSC method which will be described below. When the relative crystallinity is less than 50%, the heat resistance at a high temperature remarkably lowers. Therefore, the relative crystallinity of the final product is preferably 50% or more from the practical viewpoint. The present invention has enabled such a container to be provided.

The transparency of the container may be evaluated by haze value. The haze value is preferably 20% or less and it is preferred from the practical point of view that the container can maintain a haze value of 20% or less even when heat-treated at 120° C. The present invention has enabled such a container to be provided. The haze value is measured with an integrating sphere type HTR meter according to JIS K7105. The smaller the haze value, the higher the transparency.

It is a matter of course that the copolyester resin used in the present invention may be used in combination with a small amount of other thermoplastic resin as an auxiliary component, or may be blended with known substances generally added to thermoplastic resins, i.e., stabilizers such as ultraviolet absorbers, antistatic agents, flame retardants, flame retardation assistants, coloring agents such as dyes and pigments, lubricants, plasticizers, crystallization accelerators, nucleating agents, inorganic fillers, etc., according to the purposes, so far as the effect of the present invention is not inhibited.

EFFECT OF THE INVENTION

As is apparent from the foregoing description, the container produced by the process of the present invention has the following excellent effects:

1) by virtue of its high crystallinity, i.e., a crystallinity of as high as 50% or more, the container has a high heat resistance, i.e., has a heat distortion resistance and can maintain a haze value of 20% or less even in a heating atmosphere at about 120° C., which renders the container advantageously usable as a container of foods for cooking in a microwave oven (ovenable trays), boil-in-pack, etc., particularly as a cooking container wherein the contents can be observed from the outside thereof, and further it is suitable as a container which should be heat-sterilized or a container into which a material should be poured at a high temperature, and 2) since the transparency has been imparted without detriment to the mechanical properties, the container can be used as a protective container wherein the contents thereof can be observed from the outside thereof.

EXAMPLES

The present invention will now be described in more detail by way of the following Examples, though it is not limited to these Examples only.

Measurement conditions for main characteristic values are as follows.

(1) Melting Point and Cold Crystallization temperature

They are measured at a temperature rise rate of 10° C./min by differential thermal analysis (DSC) according to JIS K7121.

(2) Relative Crystallinity

The sheet is cut to prepare a sample for DSC measurement, and the measurement is conducted through the use of a DSC apparatus. The relative crystallinity (CR) is calculated by making use of the following equation:

$$CR = [(\Delta Hm - |\Delta Hcc|)/|(\Delta Hc)_{HOMO}|] \times 100 \ (\%)$$

wherein $\Delta Hm$ is the heat of melting (J/g) in the measurement at a temperature rise rate of 10° C./min;

$\Delta Hcc$ is the heat of transition (J/g) of the cold crystallization peak in the measurement at a temperature rise rate of 10° C./min; and $(\Delta Hc)_{HOMO}$ is the heat of crystallization (J/g) in the measurement at a temperature fall rate of 10° C./min from a molten state of an unmodified PBT homopolymer.

The crystal melts during the measurement under a rising temperature condition after the cold crystallization has proceeded. Therefore the relative crystallinity of the sample per se is determined by subtracting the absolute value of transition of the cold crystallization peak ($\Delta Hcc$) from the absolute value of the heat of melting of the crystal ($\Delta Hm$).

(3) Haze value

The haze value of the sheet after rapid cooling and maturing is measured according to ASTM D1003. The haze value of the formed article is measured in the same manner as that described in connection with the measurement of the haze value of the sheet, except that part of the side of the container is cut.

(4) Quantity of heat in cold crystallization

The sheet is cut to prepare a sample for DSC measurement, and the measurement is conducted at a temperature rise rate of 10° C./min with a DSC apparatus by differential thermal analysis (DSC) according to JIS K7121.

(5) Forming shrinkage

The forming shrinkage ($X_1$) is calculated through the use of the following equation:

$$X_1 = [(V_M - V_C)/V_M] \times 100 \ (\%)$$

wherein $V_c$ is the internal volume of a formed article in a cup form, and $V_M$ is the internal volume of a cavity mold.

(6) Filling shrinkage

The filling shrinkage ($X_2$) is calculated through the use of the following equation:

$$X_2 = [(V_c - V_F)/V_c] \times 100 \ (\%)$$

wherein $V_c$ is the internal volume of a formed article in a cup form, and $V_F$ is the internal volume of a formed article in a cup form after the cup is filled with hot water at 90° C. and then allowed to stand for cooling to room temperature.

(7) Heat shrinkage

The filling shrinkage ($X_3$) is calculated through the use of the following equation:

$$X_3 = [(V_c - V_H)/V_c] \times 100 \ (\%)$$

wherein
$V_c$ is the internal volume of a formed article in a cup form, and
$V_H$ is the internal volume of a formed article in a cup form after the cup is placed in a blast drier at 120° C. for 10 min.

(8) Haze value and relative crystallinity after heating the container

A formed article in a cup form is placed in a blast drier at 120° C. for 10 min, part of the cup is cut, and the haze value and the relative crystallinity are determined according to ASTM D1003 under the same condition as that described in the above item (2), respectively.

PRODUCTION EXAMPLE 1 (SYNTHESIS OF POLYESTER A)

A reactor provided with an agitator and a distilling tube was charged with 293.5 parts by weight of dimethyl terephthalate, 258.8 parts by weight of 1,4-butanediol and 23.9 parts by weight of ethylene oxide (2 mol) adduct of 2,2-bis(4-hydroxyphenyl)propane together with a predetermined amount of tetrabutyl titanate as an interesterification catalyst, and the reactor was sufficiently purged with nitrogen. The temperature was raised to 160° C. under atmospheric pressure, and agitation was started. Further, the temperature was gradually raised to distill off methanol formed as a by-product. When the temperature reached 240° C., the reactor was gradually evacuated and the agitation was continued under a pressure of 0.2 Torr for 2.5 hr, thereby preparing an interpolyester resin having an intrinsic viscosity of 0.92.

The percentage introduction of the comonomer was determined by $^1$H-NMR measurement wherein use was made of trifluoroacetic acid-d$_1$ as a solvent. Then the polyester resin was pelletized and subjected to a solid phase polymerization in a nitrogen stream at 190° C to prepare a polyester having a high degree of polymerization and an intrinsic viscosity of 1.40. The resultant polyester was subjected to measurements of the above-described properties. The results are given in Table 1.

PRODUCTION EXAMPLES 2 AND 3 (POLYESTERS B AND C)

Copolyester resins having various composition ratios were prepared by polymerization in the same manner as that of Production Example 1, except that the amount of addition of 1,4-butanediol and ethylene oxide (2 mol) adduct of 2,2-bis(4-hydroxyphenyl)propane was varied as specified in Table 1. The resultant polyesters were subjected to a solid phase polymerization in the same manner as that of Production Example 1, and the properties of the polyesters were measured. The results are given in Table 1.

PRODUCTION EXAMPLES 4 TO 8 (POLYESTERS D TO H)

Various copolyester resins were prepared by polymerization in the same manner as that of Production Example 1, except that ethylene oxide (2 mol) adduct of bis(4-hydroxyphenyl)methane, ethylene oxide (2 mol) adduct of bis(4-hydroxyphenyl) ether, ethylene oxide (2 mol) adduct of bis(4-hydroxyphenyl) sulfone, ethylene oxide (2 mol) adduct of bis(4-hydroxyphenyl) ketone and ethylene oxide (2 mol) adduct of 4,4'-[1,4-phenylenebis(1-methylethylidene)]bisphenol were used instead of ethylene oxide (2 mol) adduct of 2,2-bis(4-hydroxyphenyl)propane, in respective amounts of addition as specified in Table 1. The resultant polyesters were subjected to a solid phase polymerization in the same manner as that of Production Example 1, and the properties of the polyesters were measured. The results are shown in Table 1.

COMPARATIVE PRODUCTION EXAMPLE 1 (POLYESTER I)

Polymerization was conducted by making use of dimethyl terephthalate and 1,4-butanediol in starting monomer ratios specified in Table 1, thereby preparing a polybutylene terephthalate resin (PBT). The resultant polyesters were subjected to a solid phase polymerization in the same manner as that of Production Example 1, and the properties of the polyesters were measured. The results are given in Table 1.

COMPARATIVE PRODUCTION EXAMPLE 2 (POLYESTER J)

Polymerization and solid phase polymerization were conducted in the same manner as that of Production Example 1, except that the amounts of addition of 1,4-butanediol and ethylene oxide (2 mol) adduct of 2,2-bis(4-hydroxyphenyl)propane were varied as specified in Table 1, thereby preparing a copolyester. The results of measurement of properties are given in Table 1.

EXAMPLES 1 TO 3 AND COMPARATIVE EXAMPLES 1 AND 2

In order to demonstrate the difference in the properties of vacuum-formed articles due to the difference in the starting polyester, polyesters A to C and I to J were evaluated under the same T-die sheet forming conditions, sheet thickness and thermoforming conditions. Specifically, starting polyesters were dried in a blast drier at 90° C. for 5 hr and then extruded through a T-die having a width of 800 mm on a water cooling type cooling roll of 25° C. The resultant sheets had a thickness of 0.5 mm. Part of each sheet was cut to determine the haze value. Then the sheets were matured in a thermostatic oven at various temperatures for various period of times as specified in Table 2, and vacuum forming was conducted under conditions of a plug mold temperature of 80° C., a cavity mold temperature of 100° C. and a forming time of 20 sec to make cups each having a depth of 45 mm and a diameter of 90 mm. Part of the side of each container was cut to determine the haze value. The evaluation of the formed articles was conducted by the above-described methods. The results are given in Table 2.

EXAMPLES 4 TO 6 AND COMPARATIVE EXAMPLE 3

Preparation of vacuum-formed articles in a cup form and evaluation of the cups were conducted in the same manner as that of Example 2, except that the maturing temperature was varied. The results are given in Table 3.

EXAMPLES 7 AND 8 AND COMPARATIVE EXAMPLE 4

Preparation of vacuum-formed articles in a cup form and evaluation of the cups were conducted in the same manner as that of Example 2, except that the maturing temperature was varied. The results are given in Table 4.

EXAMPLES 9 AND 10 AND COMPARATIVE EXAMPLE 5

Preparation of vacuum-formed articles in a cup form and evaluation of the cups were conducted in the same manner as that of Example 2, except that the cavity mold temperature was varied. The results are given in Table 5.

EXAMPLES 11 TO 15

Regarding polyesters D to H, preparation of vacuum-formed articles in a cup form and evaluation of the cups were conducted in the same manner as that of Examples 1 to 3, except that the cavity mold temperature was varied. The results are given in Table 6.

TABLE 1

|  | Prodn. Ex. 1 | Prodn. Ex. 2 | Prodn. Ex. 3 | Prodn. Ex. 4 | Prodn. Ex. 5 | Prodn. Ex. 6 | Prodn. Ex. 7 | Prodn. Ex. 8 | Comp. Prodn. Ex. 1 | Comp. Prodn. Ex. 2 |
| --- | --- | --- | --- | --- | --- | --- | --- | --- | --- | --- |
| polymer No. | A | B | C | D | E | F | G | H | I | J |
| DMT (pts. wt.)[1] | 293.5 | 279.9 | 256.0 | 261.5 | 261.1 | 301.4 | 268.6 | 266.9 | 308.7 | 218.7 |
| BD (pts. wt.)[2] | 258.8 | 233.8 | 190.1 | 218.5 | 218.1 | 251.8 | 224.4 | 235.0 | 286.4 | 121.8 |
| EBPA (pts. wt.)[3] | 23.9 | 45.6 | 83.4 | 0 | 0 | 0 | 0 | 0 | 0 | 142.5 |
| EBPF (pts. wt.)[4] | 0 | 0 | 0 | 77.7 | 0 | 0 | 0 | 0 | 0 | 0 |
| EODF (pts. wt.)[5] | 0 | 0 | 0 | 0 | 78.1 | 0 | 0 | 0 | 0 | 0 |
| EBPS (pts. wt.)[6] | 0 | 0 | 0 | 0 | 0 | 48.3 | 0 | 0 | 0 | 0 |
| EBPK (pts. wt.)[7] | 0 | 0 | 0 | 0 | 0 | 0 | 70.3 | 0 | 0 | 0 |
| EBPP (pts. wt.)[8] | 0 | 0 | 0 | 0 | 0 | 0 | 0 | 59.7 | 0 | 0 |
| introduction of copolymer (%) | 5.0 | 11.0 | 20.0 | 20.0 | 19.8 | 10.0 | 20.2 | 10.0 | 0 | 41.0 |
| [η] | 1.40 | 1.37 | 1.38 | 1.39 | 1.37 | 1.42 | 1.40 | 1.37 | 1.50 | 1.35 |
| Tcc (°C.) | 45 | 58 | 85 | 65 | 68 | 65 | 77 | 67 | 41 | —[9] |
| Tm (°C.) | 203 | 195 | 166 | 166 | 177 | 195 | 182 | 192 | 222 | — |

Note
[1] dimethyl terephthalate
[2] 1,4-butanediol
[3] ethylene oxide (2 mol) adduct of 2,2-bis(4-hydroxyphenyl)propane
[4] ethylene oxide (2 mol) adduct of bis(4-hydroxyphenyl)methane
[5] ethylene oxide (2 mol) adduct of bis(4-hydroxyphenyl) ether
[6] ethylene oxide (2 mol) adduct of bis(4-hydroxyphenyl) sulfone
[7] ethylene oxide (2 mol) adduct of bis(4-hydroxyphenyl) ketone
[8] ethylene oxide (2 mol) adduct of 4,4'-[1,4-phenylenebis(1-methylethylidine)]bisphenol
[9] immeasurable

TABLE 2

|  | Ex. 1 | Ex. 2 | Ex. 3 | Comp. Ex. 1 | Comp. Ex. 2 |
| --- | --- | --- | --- | --- | --- |
| polymer No. | A | B | C | I | J |
| evaluation of rapidly cooled product |  |  |  |  |  |
| haze value (%) | 1.3 | 1.2 | 1.3 | 71.2 | 1.0 |
| relative crystallinity (%) | 62.1 | 41.3 | 15.6 | 96.3 | 0 |
| maturing condition |  |  |  |  |  |
| maturing temp. (°C.) | 40 | 50 | 60 | 40 | do. |
| maturing time (min) | 15 | 15 | 20 | 15 | do. |
| evaluation of matured product |  |  |  |  |  |
| haze value (%) | 1.3 | 1.4 | 1.3 | 71.4 | 1.0 |
| (ΔHcc)$_a$ (J/g) | 14.0 | 18.3 | 21.7 | 3.1 | 0 |
| thermoforming condition |  |  |  |  |  |
| plug temp. (°C.) | 80 | do. | do. | do. | do. |
| cavity temp. (°C.) | 100 | do. | do. | do. | do. |
| forming time (sec) | 20 | do. | do. | do. | do. |
| evaluation of formed article |  |  |  |  |  |
| haze value (%) | 2.9 | 3.3 | 3.4 | 86.5 | 2.3 |
| relative crystallinity (%) | 92 | 88 | 77 | 100 | 0 |
| forming shrinkage (%) | 2.1 | 2.8 | 2.0 | 10.6 | 0.9 |
| filling shrinkage (%) | 0.5 | 0.5 | 0.8 | 1.0 | 3.4 |
| heat shrinkage (%) | 0.9 | 0.8 | 0.8 | 18.9 | 22.8 |
| evaluation of formed article after heating (120° C., 10 min) |  |  |  |  |  |
| haze value (%) | 2.9 | 3.5 | 3.4 | 86.7 | 2.3 |
| relative crystallinity (%) | 92 | 88 | 78 | 100 | 0 |

TABLE 3

|  | Ex. 2 | Ex. 4 | Ex. 5 | Ex. 6 | Comp. Ex. 3 |
| --- | --- | --- | --- | --- | --- |
| polymer No. | B | do. | do. | do. | do. |
| evaluation of rapidly cooled product |  |  |  |  |  |
| haze value (%) | 1.2 | do. | do. | do. | do. |
| relative crystallinity (%) | 41.3 | do. | do. | do. | do. |
| maturing condition |  |  |  |  |  |
| maturing temp. (°C.) | 50 | 30 | 40 | 55 | 80 |
| maturing time (min) | 15 | do. | do. | do. | do. |
| evaluation of matured product |  |  |  |  |  |
| haze value (%) | 1.4 | 1.4 | 1.4 | 1.6 | 51.3 |
| (ΔHcc)$_a$ (J/g) | 18.3 | 19.3 | 18.8 | 17.5 | 2.0 |
| thermoforming condition |  |  |  |  |  |
| plug temp. (°C.) | 80 | do. | do. | do. | do. |
| cavity temp. (°C.) | 100 | do. | do. | do. | do. |
| forming time (sec) | 20 | do. | do. | do. | do. |
| evaluation of formed article |  |  |  |  |  |
| haze value (%) | 3.3 | 16.5 | 8.1 | 3.0 | 60.9 |
| relative crystallinity (%) | 88 | 88 | 88 | 89 | 88 |
| forming shrinkage (%) | 2.8 | 2.4 | 2.4 | 2.6 | 15.9 |
| filling shrinkage (%) | 0.5 | 0.4 | 0.4 | 0.5 | 0.4 |
| heat shrinkage (%) | 0.8 | 0.8 | 1.0 | 0.9 | 0.8 |
| evaluation of formed article after heating (120° C., 10 min) |  |  |  |  |  |
| haze value (%) | 3.5 | 16.9 | 8.2 | 3.0 | 61.1 |
| relative crystallinity (%) | 88 | 88 | 88 | 89 | 88 |

TABLE 4

|  | Ex. 2 | Ex. 7 | Ex. 8 | Comp. Ex. 4 |
| --- | --- | --- | --- | --- |
| polymer No. | B | do. | do. | do. |
| evaluation of rapidly |  |  |  |  |

TABLE 4-continued

|  | Ex. 2 | Ex. 7 | Ex. 8 | Comp. Ex. 4 |
|---|---|---|---|---|
| cooled product |  |  |  |  |
| haze value (%) | 1.2 | do. | do. | do. |
| relative crystallinity (%) | 41.3 | do. | do. | do. |
| maturing condition |  |  |  |  |
| maturing temp. (°C.) | 50 | do. | do. | —* |
| maturing time (min) | 15 | 5 | 20 | — |
| evaluation of matured product |  |  |  |  |
| haze value (%) | 1.4 | 1.3 | 1.4 | — |
| (ΔHcc)$_a$ (J/g) | 18.3 | 19.0 | 17.7 | — |
| thermoforming condition |  |  |  |  |
| plug temp. (°C.) | 80 | do. | do. | do. |
| cavity temp. (°C.) | 100 | do. | do. | do. |
| forming time (sec) | 20 | do. | do. | do. |
| evaluation of formed article |  |  |  |  |
| haze value (%) | 3.3 | 5.8 | 3.0 | 22.1 |
| relative crystallinity (%) | 88 | 88 | 88 | 89 |
| forming shrinkage (%) | 2.8 | 2.6 | 2.8 | 2.6 |
| filling shrinkage (%) | 0.5 | 0.6 | 0.5 | 0.6 |
| heat shrinkage (%) | 0.8 | 0.8 | 0.9 | 1.0 |
| evaluation of formed article after heating (120° C., 10 min) |  |  |  |  |
| haze value (%) | 3.5 | 5.9 | 3.1 | 22.3 |
| relative crystallinity (%) | 88 | 88 | 88 | 89 |

Note: *The thermoforming was conducted immediately after the preparation of a rapidly cooled sheet.

TABLE 5

|  | Ex. 2 | Ex. 9 | Ex. 10 | Comp. Ex. 5 |
|---|---|---|---|---|
| polymer No. | B | do. | do. | do. |
| evaluation of rapidly cooled product |  |  |  |  |
| haze value (%) | 1.2 | do. | do. | do. |
| relative crystallinity (%) | 41.3 | do. | do. | do. |
| maturing condition |  |  |  |  |
| maturing temp. (°C.) | 50 | do. | do. | do. |
| maturing time (min) | 15 | do. | do. | do. |
| evaluation of matured product |  |  |  |  |
| haze value (%) | 1.4 | do. | do. | do. |
| (ΔHcc)$_a$ (J/g) | 18.3 | do. | do. | do. |
| thermoforming condition |  |  |  |  |
| plug temp. (°C.) | 80 | do. | do. | do. |
| cavity temp. (°C.) | 100 | 80 | 140 | 55 |
| forming time (sec) | 20 | do. | do. | do. |
| evaluation of formed article |  |  |  |  |
| haze value (%) | 3.3 | 3.0 | 3.4 | 2.9 |
| relative crystallinity (%) | 88 | 87 | 88 | 45 |
| forming shrinkage (%) | 2.8 | 2.8 | 2.6 | 2.0 |
| filling shrinkage (%) | 0.5 | 0.4 | 0.5 | 5.4 |
| heat shrinkage (%) | 0.8 | 2.0 | 0.6 | 12.3 |
| evaluation of formed article after heating (120° C., 10 min) |  |  |  |  |
| haze value (%) | 3.5 | 3.4 | 3.6 | 4.4 |
| relative crystallinity (%) | 88 | 87 | 88 | 88 |

TABLE 6

|  | Ex. 11 | Ex. 12 | Ex. 13 | Ex. 14 | Ex. 15 |
|---|---|---|---|---|---|
| polymer No. | D | E | F | G | H |
| evaluation of rapidly cooled product |  |  |  |  |  |
| haze value (%) | 1.5 | 1.4 | 1.2 | 1.3 | 1.4 |
| relative crystallinity (%) | 42.2 | 28.9 | 46.3 | 24.4 | 37.8 |
| maturing condition |  |  |  |  |  |
| maturing temp. (°C.) | 50 | 50 | 50 | 60 | 50 |
| maturing time (min) | 15 | do. | do. | do. | do. |
| evaluation of matured product |  |  |  |  |  |
| haze value (%) | 1.6 | 1.4 | 1.2 | 1.5 | 1.6 |
| (ΔHcc)$_a$ (J/g) | 19.0 | 20.1 | 18.1 | 18.2 | 18.0 |
| thermoforming condition |  |  |  |  |  |
| plug temp. (°C.) | 80 | do. | do. | do. | do. |
| cavity temp. (°C.) | 100 | do. | do. | do. | do. |
| forming time (sec) | 20 | do. | do. | do. | do. |
| evaluation of formed article |  |  |  |  |  |
| haze value (%) | 4.3 | 3.3 | 3.3 | 3.4 | 2.9 |
| relative crystallinity (%) | 84 | 75 | 83 | 76 | 78 |
| forming shrinkage (%) | 2.9 | 2.0 | 2.0 | 3.2 | 3.0 |
| filling shrinkage (%) | 0.9 | 0.9 | 0.9 | 0.8 | 0.9 |
| heat shrinkage (%) | 0.9 | 0.9 | 0.9 | 1.0 | 1.1 |
| evaluation of formed article after heating (120° C., 10 min) |  |  |  |  |  |
| haze value (%) | 4.4 | 3.5 | 3.5 | 3.4 | 3.1 |
| relative crystallinity (%) | 84 | 75 | 83 | 77 | 78 |

We claim:

1. A process for producing a transparent polyester container, which comprises melt-molding a copolyester resin comprising 75 to 98 molar % of repeating units of an ester of terephthalic acid with 1,4-butanediol with the balance mainly comprising repeating units of an ester of terephthalic acid with an alkylene oxide adduct of a bisphenol compound selected from the group consisting of an ethylene oxide (2 mol) adduct of bis(4-hydroxyphenyl) sulfone, a propylene oxide (2 mol) adduct of bis(4-hydroxyphenyl) sulfone, an ethylene oxide (2 mol) adduct of 2,2-bis(4-hydroxyphenyl)propane, a propylene oxide (2 mol) adduct of 2,2-bis(4-hydroxyphenyl)propane, an ethylene oxide (2 mol) adduct of bis(4-hydroxyphenyl) sulfoxide, a propylene oxide (2 mol) adduct of bis(4-hydroxyphenyl) sulfoxide, an ethylene oxide (2 mol) adduct of bis(4-hydroxyphenyl) sulfide, a propylene oxide (2 mol) adduct of bis(4-hydroxyphenyl) sulfide, an ethylene oxide (2 mol) adduct of bis(4-hydroxyphenyl) ether, a propylene oxide (2 mol) adduct of bis(4-hydroxyphenyl) ether, an ethylene oxide (2 mol) adduct of bis(4-hydroxyphenyl)methane, a propylene oxide (2 mol) adduct of bis(4-hydroxyphenyl)methane, an ethylene oxide (2 mol) adduct of 4,4′-diphenol, a propylene oxide (2 mol) adduct of 4,4′-diphenol, an ethylene oxide (2 mol) adduct of bis(4-hydroxyphenyl)alkane, a propylene oxide (2 mol) adduct of bis(4-hydroxyphenylalkane, an ethylene oxide (2 mol) adduct of bis(4-hydroxyphenyl) ketone and a propylene oxide (2 mol) adduct of bis(4-hydroxyphenyl) ketone, rapidly cooling the molding to prepare a sheet having a low crystallinity, maturing the sheet at a temperature selected so as to meet a requirement represented by the following formula (1) to prepare a sheet satisfying a requirement represented by the following formula (2), and subjecting the sheet to thermoforming through the use of a cavity mold at a temperature falling within a range represented by the following formula (3):

| $T_a \leq T_{cc}$ | (°C.) | (1) |
| $(\Delta H_{cc})_a \geq 5$ | (J/g) | (2) |
| $T_{cc} + 2 \leq T_b \leq T_m - 2$ | (°C.) | (3) | wherein Ta is the maturing temperature (°C.),
Tb is the cavity mold temperature (°C.),
Tcc is the cold crystallization temperature (°C.) of the resin as measured at a temperature rise rate of 10° C./min by differential thermal analysis according to JIS K7121,
Tm is the melting point (°C.) of the resin as measured at a temperature rise rate of 10° C./min by differential thermal analysis according to JIS K7121, and
$(\Delta Hcc)_a$ is the quantity of heat (J/g) of cold crystallization of the sheet after maturing as measured at a temperature rise rate of 10° C./min by differential thermal analysis according to JIS S K7121.

2. The process for producing a transparent polyester container according to claim 1, wherein the intrinsic viscosity of the copolyester resin is 0.7 or more.

3. The process for producing a transparent polyester container according to claim 1, wherein the sheet is prepared by a T-die process.

4. The process for producing a transparent polyester container according to any one of claims 1 to 3, wherein the thickness of the sheet is 0.05 to 2.00 mm.

5. The process for producing a transparent polyester container according to claim 2, wherein the sheet is prepared by a T-die process.

6. The process for producing a transparent polyester container according to claim 5, wherein the thickness of the sheet is 0.05 to 2.00 mm.

7. The process for producing a transparent polyester container according to claim 1, wherein the repeating units of the ester of terephthalic acid with the alkylene oxide adduct of the bisphenol compound comprises 5 to 20 molar %.

* * * * *